United States Patent [19]

Olson

[11] Patent Number: 4,467,500

[45] Date of Patent: Aug. 28, 1984

[54] BIRD OPENING METHOD AND APPARATUS

[75] Inventor: Harold D. Olson, Smyrna, Ga.

[73] Assignee: Cagles, Inc., Atlanta, Ga.

[21] Appl. No.: 453,617

[22] Filed: Dec. 27, 1982

[51] Int. Cl.$^3$ ............................................. A22C 21/06
[52] U.S. Cl. ...................................... 17/52; 17/11
[58] Field of Search ............................ 17/11, 45, 52

[56] References Cited

U.S. PATENT DOCUMENTS

| | | |
|---|---|---|
| 2,795,815 | 6/1957 | Dahlberg ............... 17/11 |
| 3,689,961 | 9/1972 | Crane ................... 17/45 |
| 3,958,302 | 5/1976 | Meyn .................... 17/11 |
| 4,059,868 | 11/1977 | Meyn .................... 17/11 |
| 4,087,886 | 5/1978 | Aubert .................. 17/52 |
| 4,131,973 | 1/1979 | Verbakel ................ 17/52 |
| 4,136,421 | 1/1979 | Scheier ................. 17/52 |
| 4,155,146 | 5/1979 | Meyn .................... 17/11 |
| 4,257,142 | 3/1981 | Hathorn ................. 17/11 |
| 4,265,001 | 5/1981 | Hathorn ................. 17/11 |
| 4,266,322 | 5/1981 | van Mil ................. 17/11 |
| 4,339,849 | 7/1982 | van Mil ................. 17/52 |

Primary Examiner—Willie G. Abercrombie
Attorney, Agent, or Firm—Thomas & Kennedy

[57] ABSTRACT

A plurality of bird openers (36) are positioned in a circular array about a revolving carrousel framework (22) which is rotated by engagement with a moving overhead conveyor system. Each bird opener is moved vertically by a cam arrangement (35) as the carrousel framework rotates. Birds suspended from the conveyor are positioned adjacent each bird opener, with the bird opener protruding between the legs of its bird, and each bird opener is lowered down into engagement with its bird, so that a cutting element (75) enters the body cavity of the bird and cleats (54) engage the body of the bird about the opening of the body cavity to hold the bird in a stationary attitude upon further movement with the carrousel. The cutting element is thrust in an upwardly directed arc (100) away from the center axis of the carrousel framework so as to cut through the body portion of the bird and to enlarge the vent opening of the bird while the bird is held in position by the cleats.

3 Claims, 6 Drawing Figures

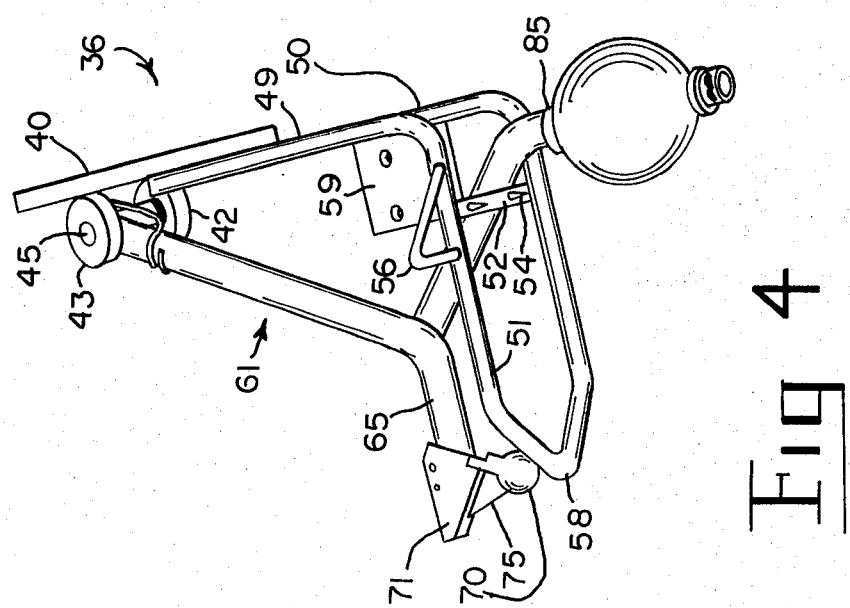
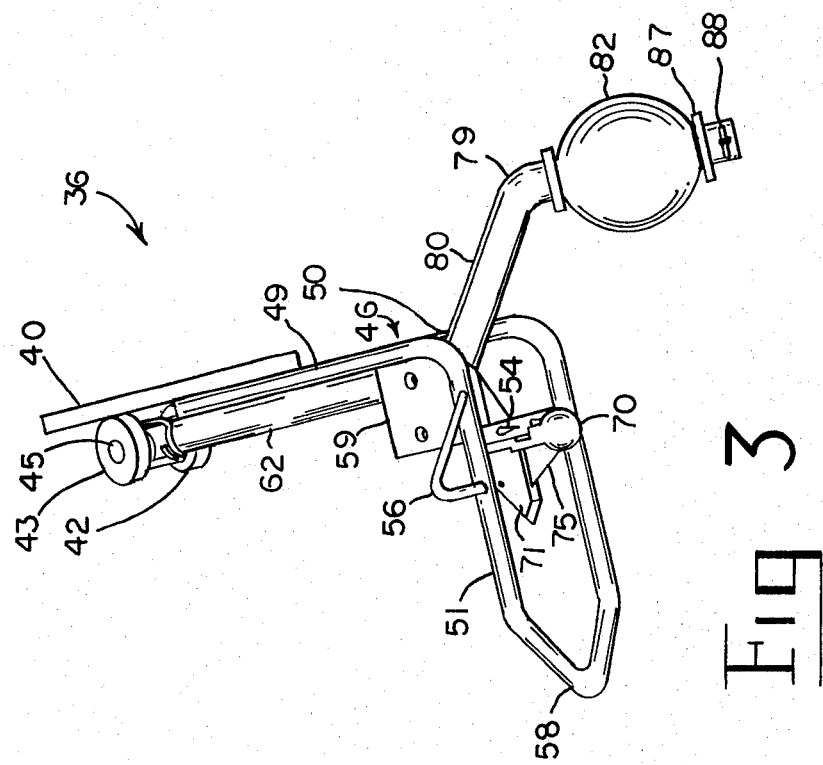
Fig 4
Fig 3

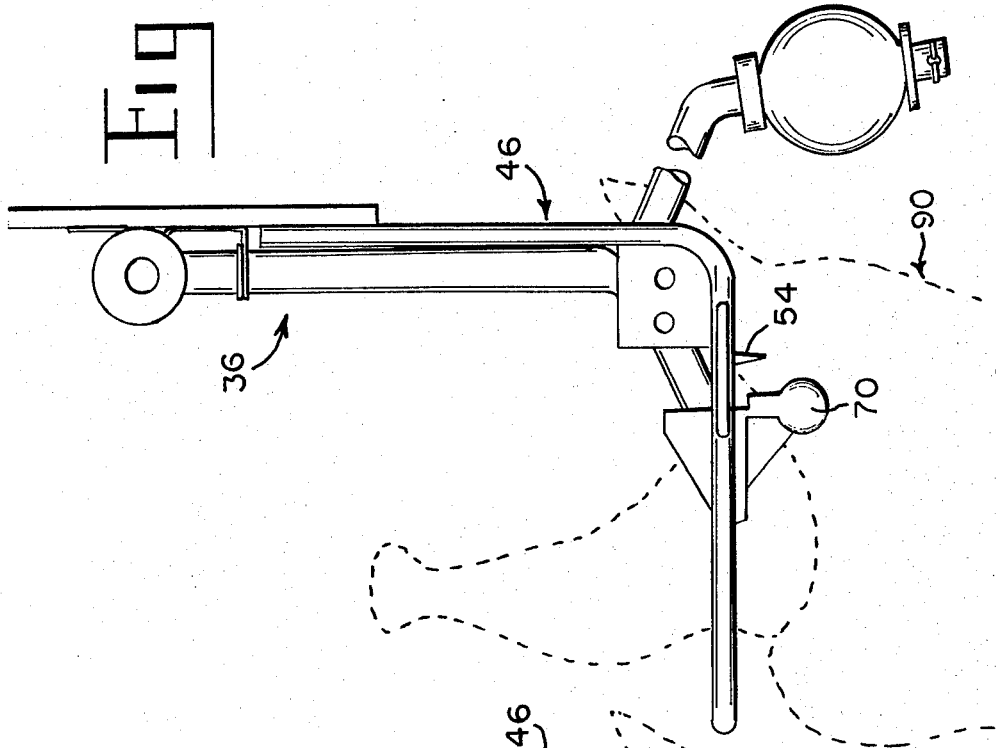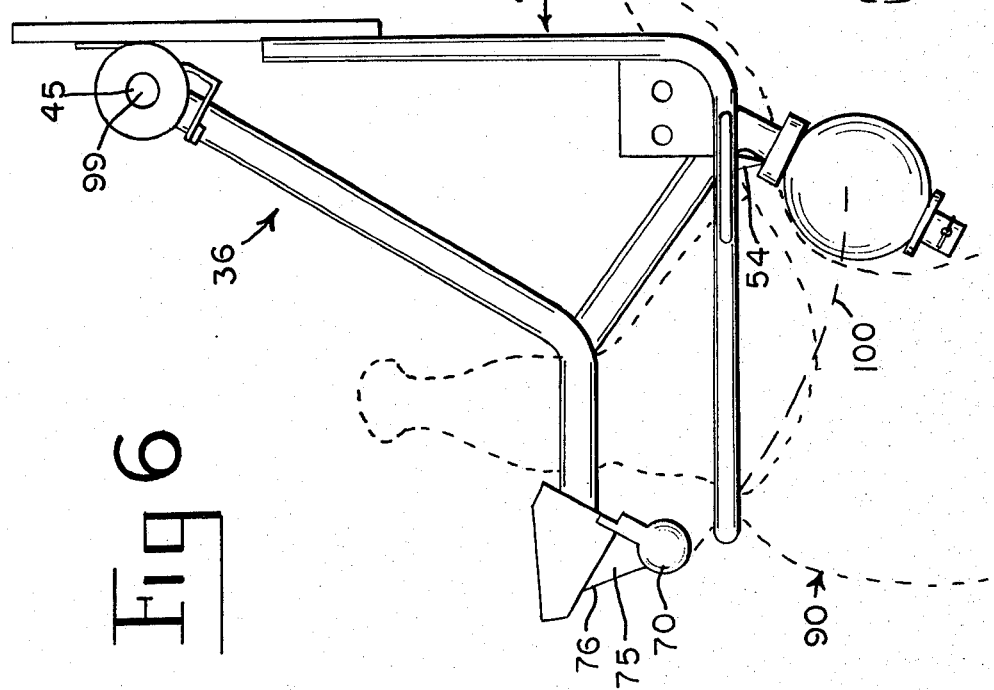

BIRD OPENING METHOD AND APPARATUS

BACKGROUND OF THE INVENTION

This invention relates to the preparation of poultry carcasses for human consumption, and more particularly, the invention relates to the stage of poultry processing after which the vent of a bird has been cut from the body to form an opening in the bird, whereupon a knife is thrust into the cut made about the vent and is moved so as to cut through the bird and enlarge the opening into the body cavity of the bird.

In the modern processing of poultry, it has become common practice to hang the birds by their feet or ankle joints from an elevated or "overhead" conveyor system and to move the birds through various processing steps in the poultry processing plant. After the birds have been defeathered, it is desirable to from a cut about the vent opening of the bird of a relatively small dimension so that the "plug" of material removed from the bird contains only a minimal amount of edible meat. After this initial cut has been made, it is necessary thereafter to enlarge this similar cut into a larger entryway into the cavity of the bird because the dimensions of the smaller cut are too limited to permit the entry of a tool into the body cavity for the purpose of removing the viscera within the cavity.

It has become common practice to move the birds to an "opener" machine which inserts a cutting element into the small, previously cut opening and which functions to cut through the body of the bird to enlarge the access opening into the body cavity of the bird. For example, U.S. Pat. Nos. 4,059,868, 4,136,421 and 4,257,142 all illustrate equipment for this purpose.

The prior art bird openers are somwhat complex in their construction and comprise a number of moving parts. The more parts and the more movement of the parts contributes to the possible malfunction of such a machine. Since birds that are to be opened by such a machine vary in size and shape, it is necessary to accurately position each bird with respect to the equipment so as to properly position the cutting blade of the equipment, and then to securely hold the bird as the cut is being made. Preferably, the cutting element is of small size so as to gain easy access in the relatively small, previously cut opening of the bird, and the apparatus functions to seize and hold and then to release each bird in the proper position and attitude. This avoids having the cutting element puncture or otherwise damage the organs of the bird which are adjacent the portion of the body that is to be cut.

SUMMARY OF THE INVENTION

Briefly described, the present invention comprises a bird opening method and apparatus which includes a carrousel that is driven by a conveyor system and which includes a plurality of bird opening stations spaced thereabout for receiving birds carried by the conveyor system. Each bird opening station includes a hold-down element that is insertable between the legs of a bird and then lowered into firm engagement with the tail portion of the bird, and a cutting element that is insertable into the previously-cut opening made about the vent of the bird. The cutting element is urged in an upward arc radially away from the axis of rotation of the carrousel so as to enlarge the cut about the vent of the bird. The hold-down member comprises a closed loop with downwardly-direct cleats for engaging the tail portion of the bird, and the cutting element is movable from a protruding position below the loop, through the upward arc until it is withdrawn from the loop. Thus, the loop holds the carcass from upward movement while the cutting element is moved through an upward cutting arc, so that the tissue of the bird is cut without causing the bird to be dislodged from the apparatus.

Thus, it is an object of this invention to provide a bird opening method and apparatus which receives a series of birds in sequence as the birds are carried by a conveyor system, which seizes each bird and enlarges the previously-cut opening about the vent, substantially without harzard of damaging other organs of the bird.

Another object of this invention is to provide a bird-opening method and apparatus which is inexpensive to construct and to operate, which has a small number of moving parts and functions reliably to open birds in an automated poultry processing plant.

Another object of this invention is to provide a hold-down and cutting assembly for a bird opener which is simple in design and is inexpensive, and which functions to reliably position a bird for the cutting stroke of a cutting element.

Other object, features and advantages of the present invention will become apparent upon reading the following specification, when taken in conjunction with the accompanying drawings.

BRIEF DESCRIPTION OF THE DRAWINGS

FIGS. 3 and 4 are perspective illustrations of a bird hold-down and cutting apparatus, with FIG. 3 showing the cutter in its retracted position, and with FIG. 4 showing the cutter in its extended position.

FIGS. 5 and 6 are side elevational views of the hold-down and cutting apparatus, with FIG. 5 showing the hold-down member in engagement with the tail portion of a bird and with the cutting apparatus inserted into the birds, and with FIG. 6 showing the hold-down member engaging the bird and with the cutting member extended after having cut through the tissue of the bird.

DETAILED DESCRIPTION

Figure 1:
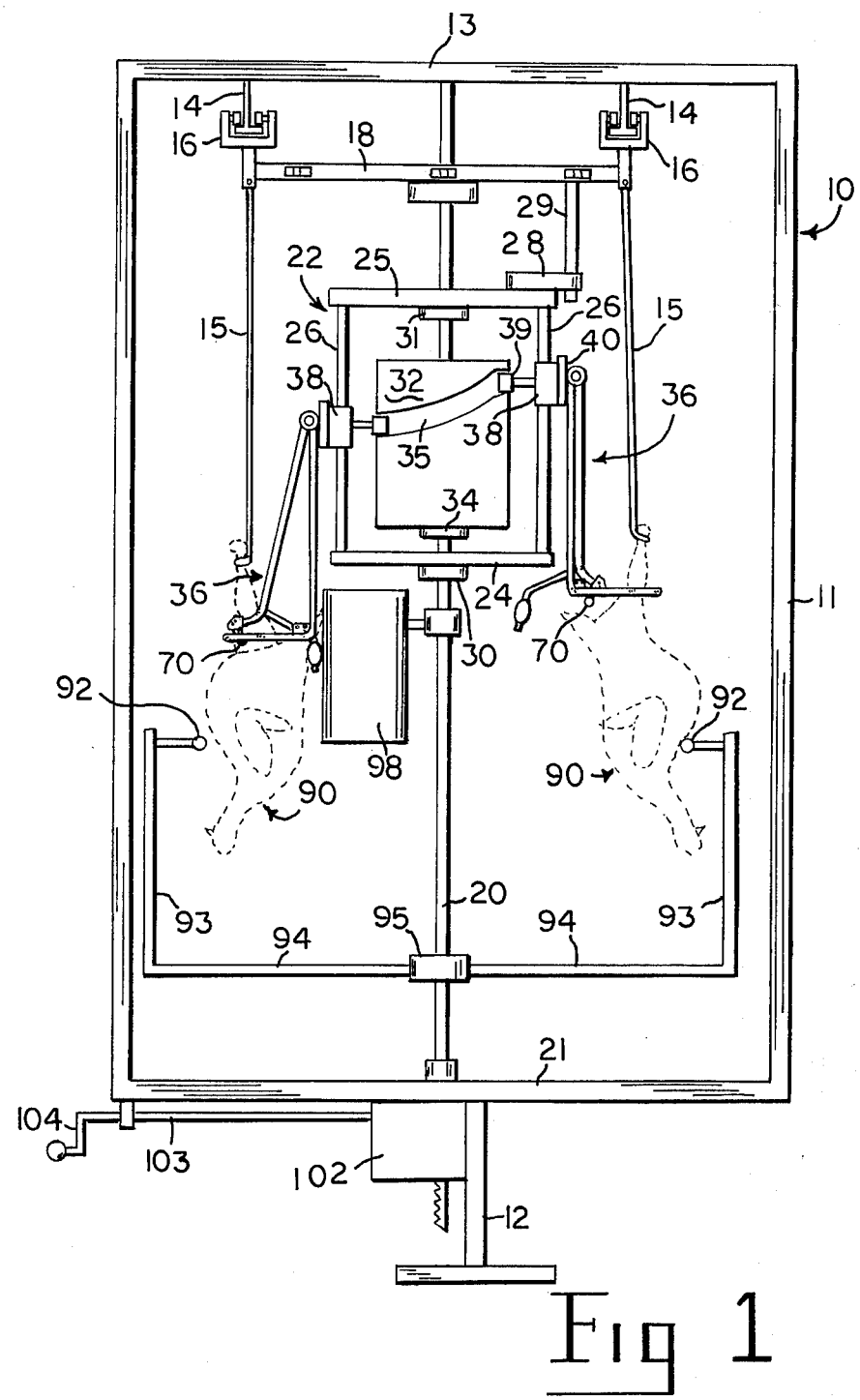
FIG. 1 is a side elevational view of the bird opening apparatus, with only two bird openers and two birds illustrated, with the remaining bird openers and birds removed for clarity.

Referring now in more detail to the drawings, in which like numerals indicate like parts throughout the several views, FIG. 1 illustrates the bird opening apparatus 10 which includes an outer framework 11, and a stand 12 for supporting the framework. The upper portion of the framework is high enough to have its upper, horizontal beam 13 extend over the conveyor line, so that an arc of the conveyor track 14 extends through and is supported by the framework 11. A plurality of shackels 15 are carried by the conveyor on trolleys 16, and the conveyor chain (not shown) that extends between adjacent trolleys connects the trolleys together. The conveyor chain is driven by a power source (not shown), and the chain of the conveyor engages the upper drive wheel 18 of the bird opening apparatus. The rotation of the upper drive wheel results in rotation of the lower elements of the apparatus.

A stationary centrally-located axle extends vertically in an upward direction from the lower horizontal beam 21 to the upper horizontal beam 13. Carrousel framework 22 is rotatably supported on axle 20. Carrousel 22 comprises lower and upper rotatable discs 24 and 25 and a plurality of vertically oriented guide bars 26 each mounted at its lower and upper ends to the discs 24 and 25. A bracket 28 is rigidly mounted to the upper disc 25, and connector rod 29 is slidably received in bracket 28 and is movable upwardly through the bracket until it engages upper drive wheel 18, so that the rotation of the upper drive wheel 18 moves connector rod 29, bracket 28 and rotatable disc 25. This causes rotation of carrousel 22 about axle 20. The lower and upper discs 24 and 25 of the carrousel are supported by collars 30 and 31 that are rigidly mounted to axle 20.

Stationary cam drum 32 is located interiorly of the carrousel 22 and is supported on axle 20 by collar 34. Cam track 35 extends about cam drum 32.

The guide bars 26 of carrousel 22 are arranged in pairs (not shown), and a bird hold-down and opening assembly or bird opener 36 is movably mounted to each pair of guide bars. Each bird hold-down and opening assembly is spaced about the carrousel 22 at distances that correspond to the spacing of the shackels 15 of the overhead conveyor system.

Each bird hold-down and opening assembly 36 comprises a slide block 38 that has vertical openings extending therethrough which are inserted about the pairs of guide bars 26, and a cam wheel 39 that is rotatably mounted to the slide block and faces the cam drum 32. The cam wheel is received in the cam track 35 of the cam drum, and movement of the slide block 38 about the cam drum 32 causes the slide block to reciprocate on its guide bars 26. As will be described in more detail hereinafter, the guide bars 26 function as vertical extending guide means and slide blocks 38 function as carriers.

Figure 2:
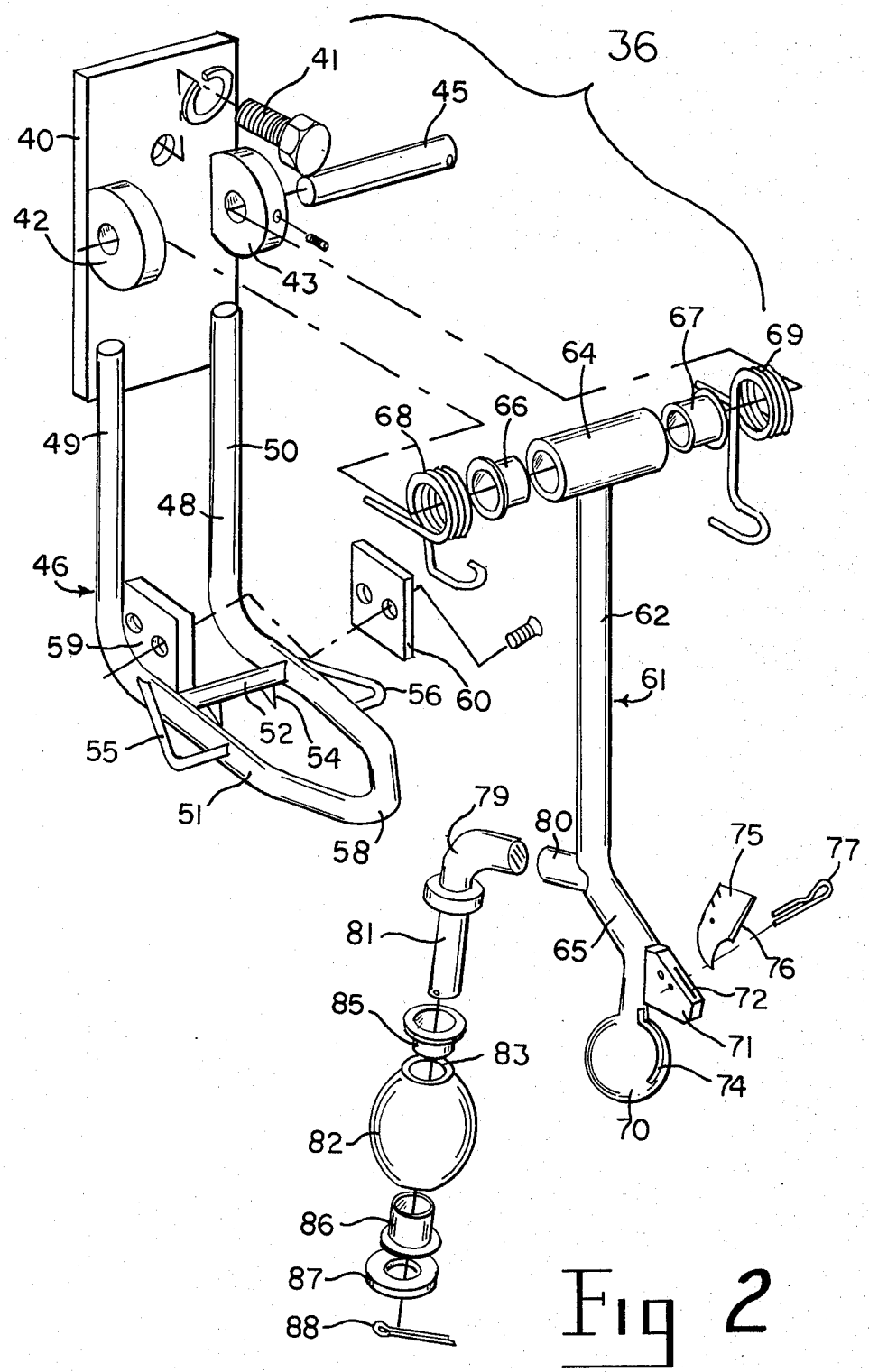
FIG. 2 is an exploded perspective illustration of a bird hold-down and cutting assembly.

As illustrated in FIG. 2, mounting plate 40 is rigidly secured to slide block 38 by a bolt 41 or other conventional fastening means. Pivot pin bosses bosses 42 and 43 are rigidly mounted to mounting plate plate 40 and and define pivot pin openings therethrough. A pivot pin 45 extends through the boss openings. Hold-down loop 46 is rigidly mounted to mounting plate 40 and comprises a U-shaped bar element 48 with vertically extending legs 49 and 50 each rigidly connected at their upper end portions to mounting plate 40. The lower closed end portion 51 of the U-shaped bar 48 is oriented at approximately a right angle with respect to the vertical legs 49. Support strut 52 extends between the horizontal portions of the legs 49 and 50 of the U-shaped bar 48. Cleats 54 protrude downwardly from strut 52. Wings 55 and 56 protrude laterally outwardly from the horizontal portions of the legs 49 and 50 adjacent the end portions of strut 52. The outer protruding end 58 of the U-shaped bar 48 is rounded.

A slide block support 59 is rigidly mounted in the crook of the L-shaped leg 49 of the U-shaped bar 48, and a bearing pad 60 of low friction material is rigidly mounted to the slide block support 59. This forms a bearing surface for the cutting arm 61.

Cutting arm 61 comprises arm 62 with a hinge pin tube 64 rigidly mounted to the arm at its upper end, and a lower angled end portion 65. The hinge pin tube 64 is arranged to fit between the pivot pin bosses 42 and 43, with the hinge pin 45 extending through the hinge pin tube and bosses. Bearings 66 and 67 are interposed between the inner surface of hinge pin tube 64 and pivot pin 45, and torsion springs 68 and 69 extend about hinge pin 45 and each spring grasps the arm 62 so as to urge the arm toward its upright attitude.

The lower angled end portion 65 of the arm 62 includes a lower, bulbous protrusion 70, and an upper holding bracket 71. Holding bracket 71 defines a slotted opening 72 that extends vertically therethrough, while the bulbous protrusion 70 defines a similar slot 74. Cutting blade 75 extends through slotted opening 72 into the slot 74, so that the sharpened edge 76 of blade 75 is exposed between the holding bracket 71 and the bulbous protrusion 70. A cotter pin of similar fastening means 77 extends through aligned openings of the blade 75 and holding bracket 71 in order to hold the blade in position. The blade extends through slot 72 into slot 74 so that its cutting edge 76 is exposed between the holding bracket and bulbous protrusion.

Cutting arm 61 includes L-shaped cam arm 79 that indicates lateral leg 80 and angled leg 81. Lateral leg 80 is rigidly mounted to lower angled end portion 65 of arm 62, and angled leg 81 extends downwardly. Oval-shaped cam roller 82 defines an opening 83 therein, and the opening extends about angled leg 81 of the L-shaped cam arm 79. Bearings 85 and 86 are interposed between the cam roller 82 and angled leg 81. A washer 87 and cotter pin or other connector 88 hold the cam roller and its bearings in place on the angled leg 81.

As illustrated in FIGS. 3 and 5, the torsion springs 68 and 69 urge cutting arm 61 to its retracted attitude, so that the bulbous protrusion 70 is located below strut 52. Cam roller 82 protrudes to the rear of the bird hold-down and opening asembly 36. The cleats 54 straddle the protrusion 70.

As illustrated in FIGS. 1 and 5, when a bird 90 is brought to the bird opening apparatus 10 by the overhead conveyor, hold-down loop 46 is in its elevated position (the right portion of FIG. 1), so that its lower closed end portion 51 tends to protrude between the legs of the bird. Guide bar 92 is oriented in a horizontal attitude and is approximately U-shaped, and extends just inside the framework 11 of the bird opening apparatus. Guide bar 92 is supported by support stanchions 93 and support bars 94 that are mounted from collar 95. Collar 95 is locked by a set screw or other conventional fastening means to the axle 20. With this arrangement, the U-shaped guide bar 92 has its open end (not shown) directed toward the oncoming birds, and as a bird approaches one of the bird hold-down and opening assemblies 36, the guide bar gently urges the bird into position, with the legs of the bird straddling the lower closed end portion 51 of the U-shaped bar 48 of the hold-down loop 46, so that the legs of the bird eventually abut the wings 55 that protrude on opposite sides of the hold-down loop 46.

As the bird opening apparatus continues its rotation, the bird hold-down and opening assembly 36 is moved down along its guide bars 26 by cam track 35. Eventually, the lower closed end portion 51 of the hold-down loop 46 is firmly seated on the upwardly facing surface of the tail portion of the bird 90. This causes the bulbous protrusion 70 to enter the previously cut opening about the vent of the bird. Also, the cleats engage the tissue of the bird on opposite sides of the opening and on opposite sides of the protrusion 70, tending to hold the tail portion of the bird in a stationary position with respect to the hold-down loop 46.

As rotation of the carrousel 22 continues, the cam roller 83 of the bird hold-down and opening assembly 36 cam surface 98, so that the cutting arm 61 is urged radially outwardly, through an upwardly extending arc, causing the bulbous protrusion 70 and its cutting blade 75 to stretch and cut into and through the tissue of the bird at the previously cut vent opening. This tends to enlarge the opening of the bird so that the viscera within the cavity of the bird is more accessible.

As illustrated in FIG. 6, the movement of the protrusion 70 and cutting blade 75 is about the axis 99 of pivot pin 45, so that the protrusion 70 and blade 75 move through a upwardly-extending arc 100 that is directed away from the axis of rotation of the carrousel 22. This upward arcuate movement causes the protrusion 70 and cutting blade 75 to move upwardly through the looped end of the hold-down loop 46 FIGS. 4 and 6). The presence of the hold-down loop 46 against the upwardly facing surface of the tail portion of the bird 90 prevents the bird from moving upwardly under the influence of the cutting arm 61. In the meantime, the cleats 54 prevent the outward movement of the bird as might be induced by the movement of the cutting blade and protrusion.

As the cutting arm 61 of the bird hold-down and opening assembly 36 moves, its side surface engages the bearing pad 60 of the slide block support 59, which tends to stabilize the lower portion of the arm 62 and the L-shaped cam arm 79 which sweep against the bearing pad. Also, the engagement of the arm 62 and L-shaped cam arm 79 against the bearing pad tends to prevent these components from the becoming warped during extended use.

In order that the equipement can be adjusted to accommodate birds of different sizes, the axle 20 can be raised or lowered by a screw jack 102. Jack 102 has its jack handle 103 extending out to an area where a crank 104 is mounted, which is acessible to the operator.

With this arrangement, bird openers or hold-down and opening assemblies 36 are positioned at intervals about the bird opening apparatus so as to be located at bird receiving stations about the apparatus, and the apparatus functions in timed relationship with the conveyor system to receive the birds in sequence, to firmly seize and position each bird, and to enlarge the opening of each bird without impeding the movement of the birds along the conveyor system.

While this invention has been described in detail with particular reference to a preferred embodiment thereof, it will be understood that variations and modifications can be effected within the spirit and scope of the invention as described hereinbefore and as defined in the appended claims.

I claim:

1. Apparatus for cutting open the body cavity of a bird wherein a plurality of birds are suspended in an inverted attitude and are moved in series on an elevated conveyor system, said apparatus comprising a carrousel framework rotatable about a vertical axis in timed response to the movement of the conveyor system, a plurality of bird receiving stations equally spaced about said framework, each said bird receiving station including a vertically extending guide means, a carrier member movable vertically along said guide means, a bird hold-down member carried by said carrier and arranged to move downwardly to rest on the tail portion of a bird between the legs of a bird, cleat members extending downwardly from said bird hold-down member for frictionally engaging and holding the tail portion of the bird in a static position, a cutting assembly pivotably mounted about a horizontal axis to said carrier and including a cutting element arranged to pivot in an upward arc radially away from the vertical axis of said framework, said cutting element being sized and shaped for insertion in a previously formed opening at the tail portion of the bird, cam means resonsive to the movement of the bird receiving station about said framwork for moving said cutting element through an upward arc radially away from the vertical axis of said framework to cut the tail portion of the bird about previously formed opening to increase the size of the opening.

2. Apparatus for cutting open the body cavity of a fowl which has had its vent opening cut out and which is supported in an inverted attitude from an elevated conveyor system, said apparatus including a plurality of spaced apart support blocks movable in response to the movement of the overhead conveyor about a circular path, cam means for raising and lowering each said support block as the support blocks are moved about the circular path, a bird opener mounted to each said support block and including a hold-down frame rigidly mounted to said support block and a cutting member pivotably mounted to said support block with a knife element that is normally positioned below said hold-down frame and is pivotable upwardly with respect to said hold-down frame, and cam means for pivoting said cutting member, the improvement therein of said hold-down frame including cleats extending therefrom in a downward direction about said knife element when said knife element is in its normal position below said hold-down frame, whereby when the vent portion of a bird is positioned by the conveyor beneath the hold-down frame the bird opener is moved down until the knife element protrudes into the portion of the bird from which the vent was cut and the cleats engage the flesh of the bird about the knife element to hold the bird stationary, and the cutting member is pivoted to cause the knife element to cut open the body cavity of the fowl.

3. In a process for enlarging the opening formed about the vent of a bird wherein the bird is suspended in an inverted attitude and a cutting blade is inserted into the previously cut opening of the bird, the improvement comprising moving a hold-down frame with downwardly extending cleats in a downward direction toward the bird until the cleats engage the bird as the cutting blade is inserted into the opening of the bird, and moving the cutting blade in an upward arc to cut through the bird as the cleats restrain lateral movement of the bird.

* * * * *